June 7, 1966  G. SUGA  3,254,413
DENTAL DRILL GUIDE
Filed Oct. 10, 1962

INVENTOR.
GORO SUGA
BY
ATTORNEY

United States Patent Office 3,254,413
Patented June 7, 1966

3,254,413
DENTAL DRILL GUIDE
Goro Suga, 45—129 Popki St., Kaneohe, Hawaii
Filed Oct. 10, 1962, Ser. No. 229,593
9 Claims. (Cl. 32—67)

This invention relates to a guide for a dental drill, and more particularly to improved apparatus for supporting and guiding a dental drill during the cavity preparation of teeth. Such guides have been proposed in order to secure greater precision in drilling and ease the strain as compared with known methods of drilling by eye or freehand.

During the preparation of a person's teeth for the installation of a crown or inlay, the dentist is often required to make a plurality of parallel or upwardly tapering drillings in the patient's teeth. For guiding the dental drill during such preparation work, so that the drillings will have the desirable parallelism or taper there are drilling guides available. However, most drill guides are either too bulky, cumbersome, or inaccurate to be of any practical value to the dentist. Moreover, most prior drill guides have lacked the maneuverability which is desirable if the dentist is to be able to prepare the teeth with a minimum expenditure of time and effort.

An object of this invention is to provide a compact, and highly maneuverable dental drill guide.

A further object of this invention is to provide an improved dental drill guide which may be mounted on the upper or lower dental arch, and which may be readily assembled or disassembled.

Another object of this invention is to provide a device that will aid a dental operator in securing parallelism in the cavity preparation of one or more teeth with precision and ease.

A further object of this invention is to provide a device which will prevent overtapering of teeth and thus prevent bridge failures or gold inlay failures.

Still another object of the present invention is to provide a handpiece drilling guide whenever it is desired to drill the walls of teeth at the same taper.

Yet another object of this invention is to provide a device which will enable a dental operator to cut from any one side, the anterior segment of the dental arch (eye tooth to eye tooth) as well as the opposite posterior segment (bicuspid and molar area).

A further object of this invention is to provide a device which will enable a dentist to cut retention grooves in the teeth which will be parallel and tilted outwardly according to the long axis of the crown of the teeth.

A still further object of this invention is to provide a device which will enable a dentist to cut all walls (vertical and lateral) by merely guiding an arm that is attached to an airotor dental drill.

Yet another object of this invention is to provide a device which might be partially assembled when the device is in the process of being secured to the teeth.

Yet another object of this invention is to provide a device which when secured in a patient's mouth might be partially disassembled to allow the dentist to do finishing and touching-up of the teeth and then assembled to do any further cutting of the teeth as may be desired by the dentist.

A still further object of this invention is to provide a device which when secured in a patient's mouth might be quickly partially disassembled to allow the patient to rest awhile.

Still another object of this invention is to provide a device which will allow the easy insertion of an airotor dental drill in a patient's mouth for drilling manipulations because the device has a provision whereby the airotor dental drill may be rotated about a substantially horizontal axis and thus the airotor dental drill need not be always in a truly vertical position.

Yet another object of this invention is to provide a device which will allow an airotor dental drill to move up and down in a patient's mouth and thus give a dentist much needed leeway in drilling that is required due to the particular configuration of the patient's mouth or teeth.

A still further object of this invention is to provide a handpiece drilling guide which allows its arm to be easily and quickly set at a desired vertical angle by merely tilting the guide about a knuckle joint.

A still further object of this invention is to provide a handpiece drill guide of small dimensions so that it not inconvenience a patient when it is secured to his teeth.

A more specific object of this invention is to provide an improved dental drill guide of the type having a placement piece which is adapted to be secured to a tooth in such manner as to minimize interference of the piece with the adjacent teeth, tongue or roof of the patient's mouth, and onto which placement piece a plurality of dental drill guiding members may be readily assembled or disassembled.

Other objects of the invention will be apparent hereinafter from the specification, and from the recital of the appended claims, particularly when read in conjunction with the accompanying drawing.

Figure 1:
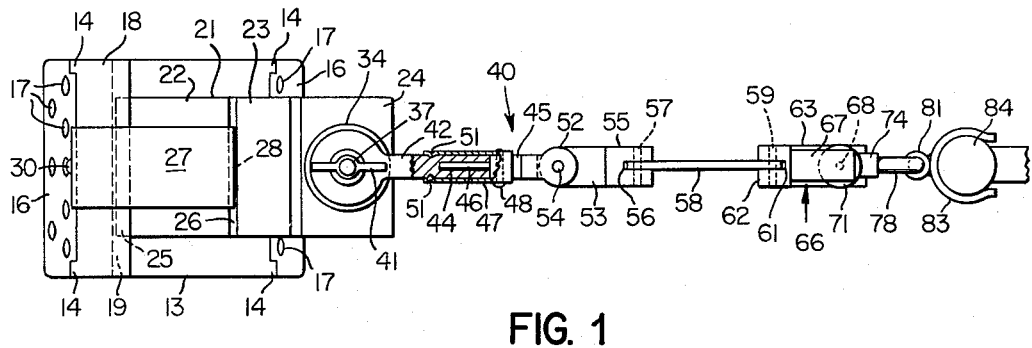
FIG. 1 is a plan view of a dental drill guide made in accordance with one embodiment of this invention.
Figure 2:
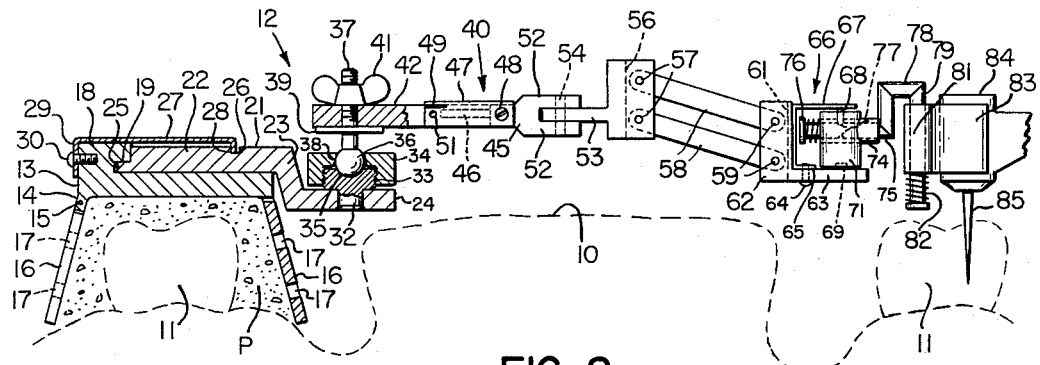
FIG. 2 is a front elevational view of the apparatus, certain of the parts being broken away and shown in section, and illustrating diagrammatically part of the dental arch of a patient's mouth and showing how the apparatus is adapted to be mounted.
Figure 3:
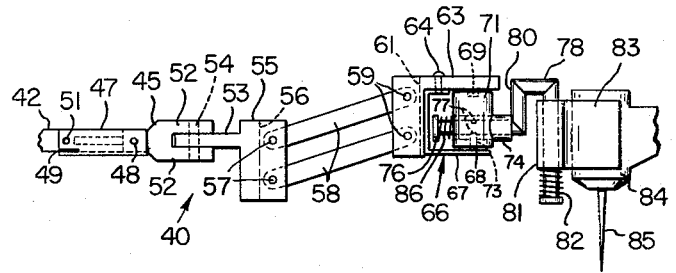
FIG. 3 is a view similar to FIG. 2, but with part of the apparatus cut away, and showing part of the guide mechanism inverted relative to its position as shown in FIG. 2.

Referring now to the drawings by numerals of reference, and first to the embodiment illustrated in FIGS. 1 to 3, the broken lines in FIG. 2 indicate diagrammatically part of the lower jaw 10 and teeth 11 of a patient. The dental drill guide 12 comprises a generally rectangular base or mounting plate 13 having integral, downwardly projecting lugs or ears 14 at each of its four corners, which flare slightly outwardly from opposite sides of the plate 13. Hinged along their upper edges by pins 15 to the two lugs 14 at each side of base plate 13 is a downwardly and outwardly flaring flap or skirt 16. Each of the skirts 16 has therethrough a plurality of spaced, circular holes 17, the purpose of which will be described more fully below. Integral with and projecting upwardly from the plate 13 along one side thereof, parallel to the hinge pins 15, is a narrow rib 18. The inner side of this rib 18 is undercut to provide a longitudinally extending groove 19.

Removably mounted on plate 13 is a carrier plate 21 having a flat portion 22 seated on plate 13, a depending portion 23 which extends diagonally downwardly over the inside edge of plate 13, and a terminal, ledge portion 24 which projects laterally away from the portion 23 in a plane disposed below and parallel to the portion 22 when the apparatus 12 is mounted as shown in FIGS. 1 and 2. To secure the carrier plate 21 to the base plate 13, the portion 22 of the carrier plate has an integral tongue 25 along its outer edge which seats in the groove 19 in the rib 18, and has in its upper face a longitudinally extending groove 26 laterally spaced from rib 18 and extending parallel thereto. Tongue 25 is held in groove 19 by means of a flexible clip or clamping plate 27 of spring steel or the like, which extends across the top of rib 18 and part of the portion 22 of the carrier plate, and has a downwardly depending flange 28 which is adapted to engage in the longitudinal groove 26 formed in portion 22. Plate 27 has a downwardly depending flange 29 (FIG. 2) at its side distal from flange 28 which is secured by a screw 30 or the like to the outside face of the rib 18. Flange 28 is urged resiliently into the groove 26 when the clamping plate is secured in place by screw 30.

Riveted by an integral stud projection 32 onto the ledge 24 of carrier plate 21 is an externally threaded bearing block 33. Secured in a segmental spherical recess 35 (FIG. 2) in the upper face of block 33 by a collar 34, which threads on block 33, in the ball head 36 of a pin 37. The pin 37 extends upwardly through a central opening 38 in the upper end of collar 34, and intermediate its ends has an integral ring flange 39. The upper end of the pin above flange 39 is externally threaded as shown in FIG. 2 and secured against flange 39 by a wing nut 41 that threads onto the pin 37 is one end of an arm 42. This arm is rectangular in cross section; and at its opposite end is provided with a central, longitudinally extending recess or slot 44 (FIG. 1) which also is rectangular in cross section. Another arm 45, which also is rectangular in cross section, has an elongate, rectangular projection 46 at one end thereof which slidably seats in the recess 44. A sleeve 47 is secured at one end by a screw 48 to arm 45, and surrounds arm 42. At its opposite end the sleeve is slotted in a longitudinal direction, as at 49, thereby to make the sleeve flexible adjacent said opposite end. The flexible end of the sleeve is provided with integral, inwardly projecting teats or protrusions 51 which seat snugly and resiliently in corresponding recesses formed in arm 42.

The free end of arm 45 is forked to provide furcations 52 between which an ear or lug 53 is pivotally mounted by means of pin 54. The ear or lug 53 is integral with and projects from one side of a generally rectangular swing block 55. Pivoted at one of their ends in a slot 56 in block 55 by pivot pins 57 are two, parallel levers or links 58, which are pivoted at their opposite ends by pins 59 in a vertical slot 61 formed in the vertically disposed leg of a generally L-shaped platform or block 62. Blocks 55 and 62 may be inverted from their positions as shown in FIG. 2 to those shown in FIG. 3, in a manner and for a purpose which will be described in more detail below.

As shown in FIGS. 2 and 3, the horizontally disposed leg 63 of platform 62 has secured thereon by means of a screw 64 one leg 65 of a nearly C-shaped clip 66. The other leg 67 of clip 66 is somewhat longer than the leg 65, and has projecting from its inner face an integral pin or detent 68 which is positioned in vertically spaced alignment with a cylindrical lug or trunnion 69 formed on the inner face of the leg 63 of block 62. The clip 66 is made of a flexible, metallic material. Rotatably and removably positioned between its leg 67 and leg 63 of block 62 is a cylindrical bearing block 71.

The bearing block 71 has a central, cylindrical recess in one end thereof which seats over the trunnion 69, and has, coaxially of the last-named recess, an opening 73 (FIG. 3) in its opposite end into which extends the pin 68. The flexible clip 66 constantly urges the pin 68 into the opening 73 with sufficient force to prevent unwanted lateral movement of the block 71, and at the same time permits block 71 to rotate coaxially about the pin 68 and trunnion 69.

Rotatably journaled in sleeve 74 secured in a transverse bore in block 71 is one end of angle bracket 75 which is circular in cross section. Bracket 75 has a nut 76 or the like threaded onto one end to prevent its accidental withdrawal from the sleeve 74. A coil spring 86, which is interposed between nut 76 and block 71, serves constantly to urge the shaft 75 to the left in FIG. 2. The portion of bracket 75 which is journaled in sleeve 74 is provided intermediate its ends with diametrally opposite recesses 77; and the sleeve 74 has an opening in its annular wall which communicates with the opening 73 in block 71 so that detent 68 can pass through block 71 and sleeve 74 resiliently to seat in one of two recesses 77 in bracket 75, thereby to prevent unwanted rotation of the bracket. At its opposite end bracket 75 is bent as at 78 into a generally U-shaped configuration, the distal leg 79 of which is substantially longer than, and extends parallel to, the other leg 80 of the U. The bracket leg 79 forms the inner race of a ball or roller bearing, the outer race of which is formed by sleeve 81 which is movable axially of, and rotatable coaxially about leg 79. A coiled compression spring 82 is interposed between sleeve 81 and the terminal end of leg 79 so that the sleeve will constantly be urged in one direction on leg 79. Secured by solder or the like to the exterior of the sleeve or bearing housing 81 is a generally C-shaped clamp 83, which is adapted resiliently to grip the head 84 of a conventional dental drill 85 as shown in FIGS. 1 to 3.

In operation, the base plate 13 is adapted to be secured by a fast setting dental plaster P on to the top of either a lower or upper molar or bicuspid, depending upon the location of the teeth to be drilled so that the base plate is disposed in a substantially horizontal plane as shown in FIGS. 1 and 2. The holes 17 in the skirts 16 permit the plaster to enter therein and assure good retention of the skirts on the plaster. The base plate 13 may be inserted into the patient's mount either before or after the clamping plate 27 has been secured thereto. In the latter case, after the dental plaster has set, the clip 27 may be spread manually from the upper surface of plate 13 a sufficient distance to permit placing of carrier plate 21 onto the upper surface of the base plate 13, until the tongue 25 on the carrier plate seats in the groove 19, and clip 27 is then released so that the latching flange 28 engages in groove 26. After the carrier plate 21 has been secured to plate 13 together with the drill support, which is designated as a whole at 40, and which comprises pin 39, arms 42 and 45, block 55, links 58, bracket 62, block 71, angle bracket 75, and clip 83, the drill head 84 is inserted into clamp 83 in preparation for the drilling of the patient's teeth. The guide is now ready to be used by a dentist to drill any tooth in the anterior segment of the dental arch (eye tooth to eye tooth) as well as any tooth in the opposite posterior segment (bicuspid and molar area).

If during the drilling the dentist finds it desirable to permit the patient to rest for a period of time, he need only slide carrier plate 21 longitudinally out of the grooves 19 and 26, thus removing the bulk of the mechanism which had been disposed in the patient's mouth. To replace the apparatus, the base plate having remained within the patient's mouth, the dentist need only insert tongue 25 into groove 19 and pry up clamping plate 27 sufficiently to permit the carrier plate to be slid onto base plate 13.

Since the teeth of a human being are not normally straight vertically, the retention grooves for a crown or inlay must be cut or drilled according to the manner in which the teeth are shaped, the limited universal movement permitted by the pin 37 enables the support 40 to tilt according to the substantially vertical or long axes of the anterior teeth prior to cutting or drilling thereof so that the cuts may be made substantially parallel to the long axis of a respective tooth.

Depending upon the particular patient, the dentist may find it desirable to invert block 55 from the position in which it is shown in FIG. 2 to the position in which it is shown in FIG. 3. Such inversion may be desirable if the upper edge of the block as illustrated in FIG. 2 tends uncomfortably to abut the roof of a patient's mouth. To invert the mechanism, the dentist need only spread the flexible ends of the connecting plate 47 so that the detents 51 are removed from the corresponding recesses in the arm 42. Arms 42 and 45 are then separated, and arm 45 is rotated 180° and then reinserted into arm 42 until it is once again connected to the latter with the detents 51 reseated in recesses in arm 42. In this respect it will be noted that detents 51 are disposed so that they are positioned approximately midway between the top and bottom of arm 42, and hence in line to engage in the recesses in arm 42 whenever arm 45 is disposed in either of its two positions as shown in FIGS. 2 and 3, respectively.

Figure 4:
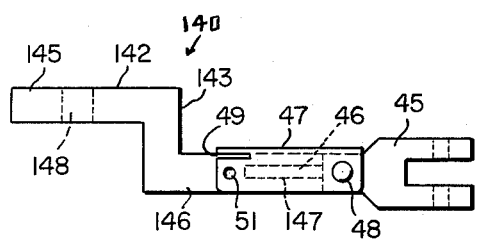
FIG. 4 is a detailed view of a modified form of the dental guide support arm employable with this invention.

FIG. 4 illustrates part of a modified support 140 somewhat similar to the support 40 employed in the embodiment shown in FIGS. 1 to 3. As in the case of support 40, support 140 comprises a first arm 142 which is rectangular in cross section, but which is provided intermediate its ends with a right angular step portion 143 so that opposite ends 145 and 146, respectively, of the arm are parallel to one another but offset from one another. Also as in the case of support 40, the end 146 of rod 142 is provided with a centrally disposed, rectanguar recess 147 into which the projecting portion 46 of an arm 45, is adapted to be secured by a connecting plate 47, employed in the first-described embodiment of the invention. The end 145 of rod 142 is provided with an opening 148 therethrough so that it may be secured onto a knuckle joint pin 37 in the manner illustrated in FIG. 2. By using the arm 142 in the modified support 140 the dentist is afforded an even greater latitude in dropping or raising the block 55 relative to the mounting plate 13 in a patient's mouth.

The parallel links 58 provide a ready means for raising and lowering the entire block 62 and the apparatus mounted therein in a transverse plane relative to plate 13. It is to be understood that spring washers or the like are interposed between the pivot ends of the links 58 and the respective side walls of the slots in which they are mounted in blocks 55 and 62 so that the links are frictionally held against undesired rotation about the pins 57 or 59. Hence, once the dentist or operator has swung the links 58 about block 55 to place block 63 in a predetermined vertical position relative to the base plate 13, the links 58 will maintain the platform in such position until the dentist or operator once again applies sufficient force to overcome the frictional forces which tend to prevent any swinging movement of the links 58.

In addition to permitting the ready insertion and removal of the bearing block 71 from between the detents 68 and 69, the flexible bracket 66, through the agency of its detent 68, tends to preclude the rotation of bracket 75 in the bearing 74, but at the same time is sufficiently flexible to permit the bracket to be rotated into either one of the two positions in which detent 68 will engage one or the other of the recesses 77 in the bracket. This permits easy insertion and manipulation of the drill 84 in a patient's mouth.

Although it is preferred to employ dental plaster for securing the guide 12 to one's tooth, it is apparent that skirts 16 could be formed in the shape of clamps of the type presently used to hold rubber dams in a patient's mouth, in which case plate 13 would be mechanically clamped to one's tooth. Moreover, the exterior of collar 34 may be knurled or provided with a couple of radial projections to provide a handy means for tightening it down onto the threaded block 33. Also, lock washers or the like may be employed between nut 41 and arm 42 to stabilize the connection.

While the invention has been described in connection with two specific embodiments thereof, it will be understood that it is capable of further modification, and this application is intended to cover any variations, uses, or adaptations of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. Apparatus for guiding a dental drill for drilling cavities in teeth, comprising
 (a) a base plate adapted to be secured onto the cutting surface of a tooth, and having a plane surface extending substantially transversely to the vertical centerline of the tooth, when said base plate is secured thereon,
 (b) a carrier plate having a plane surface,
 (c) resilient clamping means removably securing said carrier plate on said base plate with said plane surfaces disposed in confronting engagement, and with part of said carrier plate projecting beyond one side of said base plate,
 (d) cooperating means on said base plate, said carrier plate, and said clamping means for guiding said carrier plate for manual sliding movement relative to said base plate and clamping means in a direction generally parallel to said one side to disengage said carrier plate from said base plate and clamping means,
 (e) a first member,
 (f) means connecting said first member at one end to said projecting part of said carrier plate to have limited universal movement relative to said carrier plate, including pivotal movement about an axis extending transverse to said plane surfaces,
 (g) a second member connected to the opposite end of said first member to pivot about an axis extending parallel to the pivotal axis of said first member,
 (h) a third member having a clamp thereon for gripping and holding the head of a dental drill, and
 (i) a pair of parallel links, each of which is pivoted at one end to said second member and at its opposite end to said third member, said links being operative to guide said third member for arcuate movement about said second member in a plane containing said pivotal axis of said first member.

2. Apparatus for guiding a dental drill for drilling cavities in teeth, comprising
 (a) a base plate adapted to be secured on the cutting surface of a tooth substantially transverse to the tooth height,
 (b) a carrier plate having a tongue portion slidably seated in a groove extending across said base plate,
 (c) resilient clamping means engaging and urging said carrier plate in a direction to maintain its tongue portion seated in said groove, said carrier plate being manually slidable in the longitudinal direction of said groove to disengage itself from said clamping means and said groove,
 (d) a rigid, two-piece arm,
 (e) means connecting said arm at one end thereof to said carrier plate for limited universal movement about a point which is laterally offset from said base plate,
 (f) a block having an integral lug pivotally connected at one side to the opposite end of said arm, said lug being offset from the center of said block,
 (g) means mounted on the opposite side of said lug for holding a dental drill head,
 (h) means intermediate the ends of said two-piece arm removably connecting together opposite ends of said arm and manually operable to effect the rotation of the part of said arm connected to said lug 180° relative to the remaining part of said arm thereby to invert the position of said block and the holding means carried thereby.

3. Apparatus as claimed in claim 2 wherein said two-piece arm comprises (a) a first arm having a central opening extending longitudinally inwardly from one end thereof, and (b) a second arm having a longitudinal projection at one end thereof extending into said opening, and wherein (c) a clamp is secured at one end to one of said arms and has a detent on the other end thereof resiliently engaged in a corresponding recess in the other of said arms to secure together said one end of said arms, (d) said other end of said clamp being flexible and manually movable to disengage said detent from said recess when it is desired to separate said first and second arms.

4. Apparatus for guiding a dental drill for drilling cavities in teeth, comprising
 (a) a base plate having a lower face adapted to be secured by dental plaster onto the cutting surface of a tooth,
 (b) a carrier plate,
 (c) clamping means removably securing said carrier plate on said base plate with a first portion of said carrier plate seated on the upper face of said base plate, a second portion extending downwardly from said first portion over one side of said base plate, and a third portion extending laterally outwardly from said second portion and away from said first portion in a plane spaced beneath the upper face of said base plate,
 (d) a first member,
 (e) means connecting said first member at one end to said third portion of said carrier plate for limited universal movement relative to the latter,
 (f) a second member having an integral lug on one side thereof pivotally connected to the opposite end of said first member to pivot thereon about a first axis,
 (g) a bearing block having a circular opening therethrough,
 (h) means connecting said block to said second member for movement in an arcuate path about said second member and in a plane containing said first axis, the last-named means being operative constantly to maintain the axis of said opening normal to said first axis, and
 (i) a shaft extending through said opening coaxially thereof and having a clamp thereon for holding the head of a dental drill.

5. Apparatus as claimed in claim 4 wherein
 (a) said base plate has a plane upper surface and an integral rib extending along the side of the base plate opposite said one side thereof and projecting above said surface,
 (b) said first portion of said carrier plate is seated on said plane surface with one edge thereof abutting said rib,
 (c) said first portion includes an integral tongue portion which projects into a corresponding recess in said rib, and
 (d) said clamping means comprises a flexible plate secured along one edge to said rib and extending over said rib and said first portion of said carrier plate, and
 (e) said flexible plate has along its opposite edge a downwardly depending latching flange which is resiliently urged into a recess in the upper face of said first portion of said carrier plate to retain said tongue portion of the carrier plate removably seated in the first-named recess.

6. Apparatus as defined in claim 4 wherein
 (a) said first member comprises a two-piece arm including two separable parts having outer ends connected to said third portion of said carrier plate and to said lug on said second member, respectively, and two inner ends abutting one another intermediate said outer ends,
 (b) one of said inner ends has a rectangular boss projecting therebeyond and into a cooperating recess in the other of said inner ends, and
 (c) a flexible member is secured at one end to one of said parts and has at least one detent thereon which is resiliently seated in a corresponding recess in the other of said parts and manually removable from the last-named recess whereby said two parts may be separated and one of them rotated 180° to an inverted position relative to the other,
 (d) said detent being reengageable with said last-named recess upon the reconnection of the inverted part to said other part.

7. Apparatus as claimed in claim 4 wherein said last-named means comprises a generally L-shaped block, and
 (b) two, parallel links, each of which is pivotally connected at one end to said second member, and at its opposite end to a first leg of said L-shaped block, the pivotal axes of said links extending parallel to one another and normal to said first axis and the axial centerline of said opening, and
 (c) means is provided on said L-shaped block for mounting thereon said bearing block for pivotal movement about an axis extending parallel to said first axis.

8. Apparatus as claimed in claim 7 wherein
 (a) said bearing block in each end thereof has a recess extending axially of the axis of rotation of said bearing block, and one of which last-named recesses communicates with the circular opening extending through the bearing block, and wherein said mounting means comprises
 (b) a bracket secured to said L-shaped block and having a flexible leg portion spaced from and extending parallel to the second leg of said L-shaped block,
 (c) each of the two last-named legs having aligned bosses projecting from their confronting faces, and coaxially into said recesses in opposite ends of said bearing block thereby to guide the latter for rotation about its pivotal axis.

9. Apparatus as claim in claim 8 wherein one of the last-named detents extends through said one recess and engages resiliently in a further recess in the peripheral surface of said shaft to prevent undesirable rotation thereof in said bearing block.

References Cited by the Examiner

UNITED STATES PATENTS

| | | | |
|---|---|---|---|
| 1,321,130 | 11/1919 | Schlueter | 32—67 |
| 1,387,329 | 8/1921 | Stark | 32—67 |
| 1,407,840 | 2/1922 | Cruttenden | 32—67 |
| 1,447,774 | 3/1923 | Fortunati | 32—67 |
| 2,303,475 | 12/1942 | Karlstrom | 32—67 |
| 2,318,403 | 5/1943 | Karlstrom | 32—67 |
| 2,675,615 | 4/1954 | Rosenberg | 32—67 |
| 3,063,149 | 11/1962 | Suga | 32—67 |

FOREIGN PATENTS 680,764  9/1939  Germany.

RICHARD A. GAUDET, *Primary Examiner.*

RICHARD J. HOFFMAN, ROBERT E. MORGAN, *Examiners.*

H. PEZZNER, J. W. HINEY, JR., *Assistant Examiners.*